United States Patent

[11] 3,629,509

[72] Inventor Arthur B. Glaser
East Orange, N.J.
[21] Appl. No. 820,813
[22] Filed May 1, 1969
[45] Patented Dec. 21, 1971
[73] Assignee Bell Telephone Laboratories, Incorporated
Murray Hill, N.J.

[54] N-PATH FILTER USING DIGITAL FILTER AS TIME INVARIANT PART
8 Claims, 11 Drawing Figs.

[52] U.S. Cl. .......................................................... 179/15 A,
178/50
[51] Int. Cl. .......................................................... H04j 3/04
[50] Field of Search ..........................................179/15 APC,
15 BWR, 15 ACS; 178/50

[56] References Cited
UNITED STATES PATENTS
3,497,625 2/1970 Hileman ........................ 179/15 (APC)
3,358,083 12/1967 Helm ............................ 178/50

*Primary Examiner*—Ralph D. Blakeslee
*Attorneys*—R. J. Guenther and William L. Keefauver

ABSTRACT: A time division multiplexed digital filter is used as the time-invariant part of an N-path filter. The use of a multiplexed digital filter alleviates the problem of closely matching the transmission characteristics of each of the N-paths.

INVENTOR
A.B. GLASER
BY

ATTORNEY

N-PATH FILTER USING DIGITAL FILTER AS TIME INVARIANT PART

BACKGROUND OF THE INVENTION

1. Field of the Invention

This invention pertains to time-varying networks and, more particularly, to N-path filter networks.

2. Description of the Prior Art

Time-varying networks of the N-path filter type have assumed a well-defined role in the network theory art. In this era of integrated circuitry, N-path networks are particularly advantageous because of their ability to provide band-pass transmission characteristics without the use of inductive elements.

An N-path system generally comprises a time-invariant 2N-port network in cascade with input and output modulators. Typically, each path of the system comprises an input modulator, a time-invariant network, and an output modulator. The input and output modulating signals for each path are periodic, usually identical, and differ by fixed time delays from path to path. For an exhaustive discussion of such systems, see "An Alternative Approach to the Realization of Network Transfer Functions: The N-Path Filter," *Bell System Technical Journal*, Sept. 1960, pp. 1321–1350, and U.S. Pat. No. 3,081,434, issued to I. W. Sandberg on Mar. 12, 1963.

A major disadvantage of existing N-path filters is the requirement that the transmission characteristic of each path be substantially identical, in order that time-varying modulation products may be cancelled at the output of the N-path system by destructive interference. The use of N-path systems has been limited in the past because of this requirement.

It is, therefore, an object of this invention to overcome this serious limitation of prior art systems.

SUMMARY OF THE INVENTION

This and other objects of this invention are accomplished, in accordance with the principles of this invention, by utilizing a unitary digital filter operating at a time rate that permits applied signals to be time division multiplexed, thereby alleviating the need for a plurality of networks. Accordingly, because only one filter is utilized, there is no necessity to match transmission characteristics since each signal propagates through the same network.

Further features and objects of this invention, its nature and various advantages, will be more apparent upon consideration of the attached drawings and the following detailed description of the drawings.

DETAILED DESCRIPTION OF THE INVENTION

Figure 1:
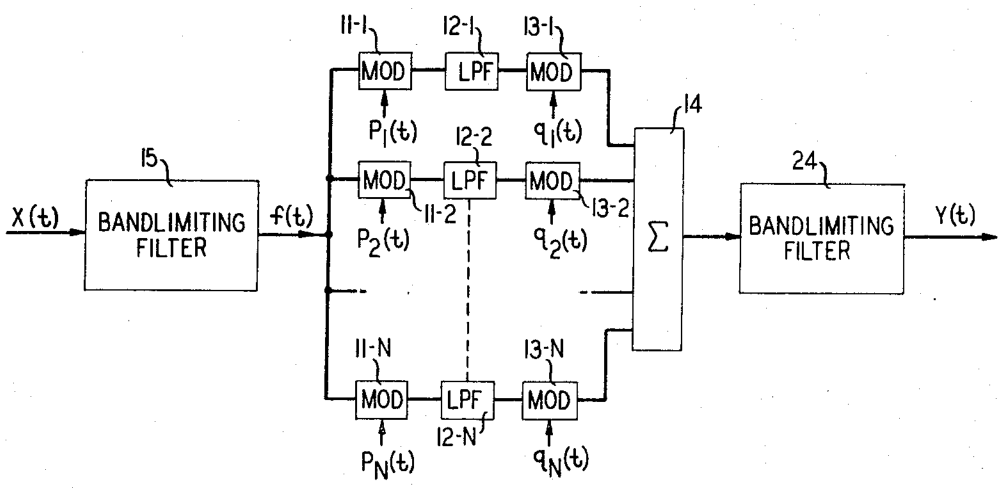
FIG. 1 illustrates a typical N-path filter system.

FIG. 1 depicts a conventional N-path filter of the type, e.g., disclosed in the aforementioned Sandberg patent. An applied input signal $x(t)$ is bandlimited and then modulated within N modulators 11–1 to 11–N and each resultant modulated signal is applied to a low-pass filter 12–1 to 12–N, respectively. The output of each filter is, in turn, modulated, respectively, within one of modulators 13–1 to 13–N, after which all of the N processed signals are additively combined in combinatorial, i.e., summing, circuit 14 to develop an output signal $y(t)$ after further filtering. Modulating signals $p_1(t)...p_N(t)$ and $q_1(t)...q_N(t)$ may comprise a series of identical periodic waves displaced in phase by a factor T/N where T corresponds to the fundamental period, $2\pi/w_0$, of the waves $p(t)$ and $q(t)$, and N corresponds to the number of paths in the system. Since the transfer function of the depicted system may be represented by the transfer function of one of the low-pass filters 12, transposed in frequency and symmetrically centered about each of the frequency components of $p(t)$, the system exhibits the characteristic of a band-pass filter. One of the major problems in the implementation of the N-path filter, as shown, is the matching of the transmission characteristic of each path. Ideally, each low-pass filter 12–1 to 12–N should be identical if time-varying modulation products are to be cancelled at the output of the system by destructive interference. Furthermore, the characteristic of each modulator and each path should likewise be identical. It will be recognized by those skilled in the art that such requirements are more easily realized in theory than they are in practice.

Figure 2:
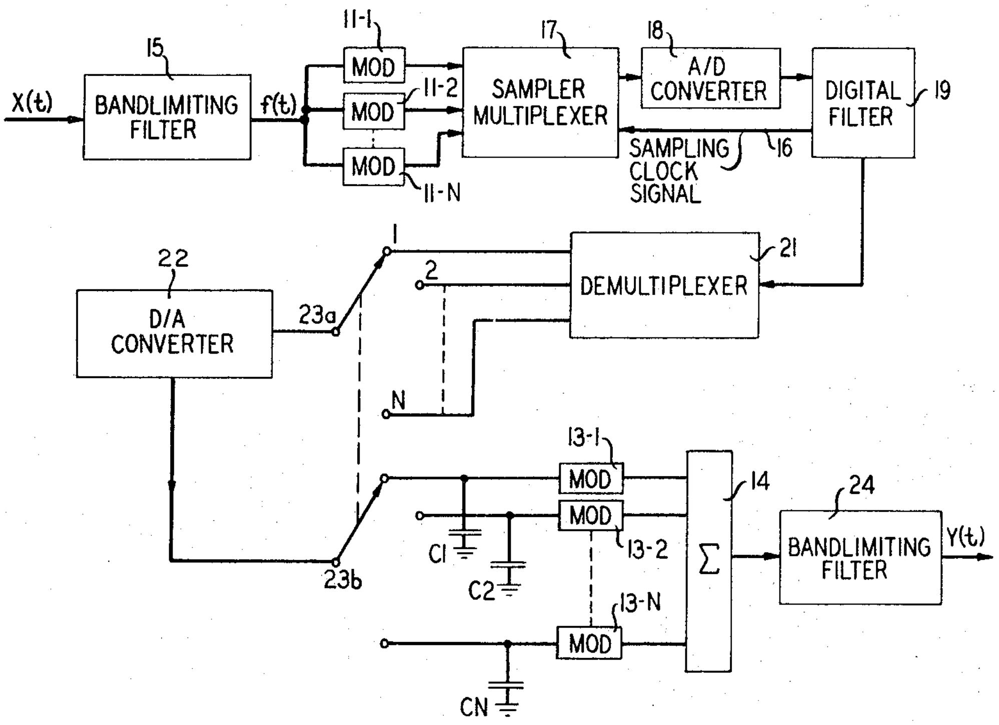
FIG. 2 illustrates the N-path filter system of this invention utilizing a digital filter.

A system which overcomes these difficulties in accordance with this invention is illustrated in FIG. 2. An applied signal $x(t)$ is processed by bandlimiting filter 15 to remove undesired signal components. The filtered signal $f(t)$ is applied to a plurality of modulators 11–1 to 11–N which are identical in all respects to the input modulators depicted in FIG. 1. As will be shown hereinafter, by the practice of this invention a plurality of input modulators is not generally required. Nonetheless, consideration of the system as depicted will, it is believed, make more understandable further inventive refinements to be disclosed hereinafter.

The N-modulated signals are applied to sampler-multiplexer 17. In a well-known fashion, apparatus 17, of any conventional type, samples the N-modulated signals, in turn, and develops a serial signal train of the various sample pulses. These multiplexed sample pulses are encoded by conventional analog-to-digital converter 18 and applied to digital filter 19. Digital filter 19 processes the applied encoded pulses in accordance with a predetermined filtering scheme. Any well-known digital filter may be utilized; see, for example, "Digital Filters" by J. F. Kaiser, page 218 of *System Analysis By Digital Computer*, edited by Kuo and Kaiser, John Wiley and Sons, 1966. Synchronization between filter 19 and sampler-multiplexer 17 is maintained by sampling-clock signals applied by filter 19 to apparatus 17 via line 16. Digital signals emanating from filter 19 are applied to demultiplexer 21 which, as the name implies, develops N-parallel signal outputs corresponding to the digitally filtered versions of the original N-signals applied to apparatus 17. Digital-to-analog converter 22 operates sequentially, via commutator 23*a*, to convert the N-digital filtered signals into N-analog signals. Commutator 23*b* is synchronized with commutator 23*a*, as indicated by the broken line, and therefore applies each one of the N-signals to an appropriate shunt capacitor, $C_1, C_2...C_N$, which amplitude smooths the converted signals. Conventional hold networks may be substituted for the capacitors, if so desired. Modulators 13–1 to 13–N, which are identical to the similarly identified modulators of FIG. 1, demodulate each of the N-signals; the demodulated signals are then additively combined by network 14. The resultant signal is bandlimited by filter 24 to remove extraneous components, thereby developing the desired output signal $y(t)$. Thus, it may be noted the signals in each of the N-paths are processed by the same filter instead of by a set of similar filters. The only components that are not shared are the capacitors and input and output modulators; as will be discussed hereinafter, input modulators 11–1 to 11–N may be embodied in a form which eliminates duplication of the input modulating apparatus. Accordingly, the problem of closely matching the transmission characteristics of diverse filters is alleviated and, as a consequence, it has been found that time-varying modulation products are suppressed 10 to 20 db. more than in conventional N-path filter implementations.

Figure 3:
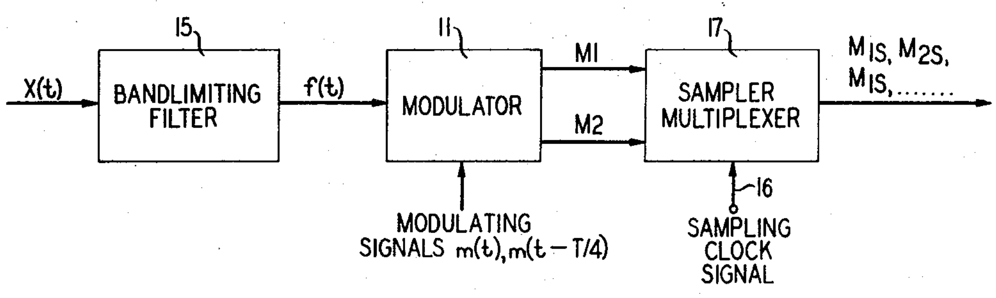
FIG. 3 depicts a modified version of the first three stages of FIG. 2.

It can be shown that if N is an even number, the N-path system can be implemented using only N/2 input channel modulators. Illustratively, if N equals 4, the N-path system can be realized using only two modulators, and two modulating signals, the second of which is delayed relative to the first by T/4 seconds, i.e., differing in phase by $2\pi/N$ radians. Fig. 3, e.g., depicts in block form, the first three stages of the system of FIG. 2. As discussed above, the input signal $x(t)$ is bandlimited by apparatus 15 to develop a signal $f(t)$ which is multiplied, in modulator 11, by signals identified as $m(t)$ and $m(t-T/4)$. The product of $f(t)$ and the first modulating signal $m(t)$ is designated as $M_1$, and the product of $f(t)$ and $m(t-T/4)$ as $M_2$. $M_{1s}$ and $M_{2s}$ represent the interleaved samples of signals $M_1$ and $M_2$ developed by sampler and multiplexer apparatus 17.

Ideally, the modulating signal $m(t)$ should be a pure sinusoid having the desired band-pass center frequency. Since it is extremely desirable that N-path filters be tunable, i.e., that the center frequency of the desired passband be easily altered, a system using a sinusoidal modulating signal would require a tunable sinusoidal oscillator and tunable phase shifters to develop the required modulating signals. Unfortunately, the accuracy necessitated by N-path systems cannot be achieved in an economical manner using such apparatus. An alternative is to use a modulating signal consisting of rectangular pulses having a repetition rate equal to the desired center frequency. Although a pulse train of this type may be generated easily, pulse signals are so rich in harmonic content that they impose severe operating requirements on the N-path system. A modulating signal possessing many of the advantages of the above-described signals and few of their disadvantages is the multilevel approximation to a sinusoid $m(t)$, phase 1, shown in FIG. 4A. FIG. 4B depicts phase 2, the same modulating signal delayed in time by T/4 seconds, i.e., $m(t-T/4)$.

In accordance with the principles of this invention, it is not necessary that the depicted modulating signals be generated, multiplied in individual modulators with the applied input signal, and finally multiplexed by separate and distinct apparatus. Rather, an operational amplifier circuit configuration, such as shown in FIG. 5, may be utilized to simultaneously generate, multiply and multiplex the desired signals. In FIG. 5, signal $f(t)$, emanating from bandlimiting filter 15, of FIG. 2 or FIG. 3, is applied to two paths, which comprise resistors and transistor switches $Q_1$, $Q_2$, etc., supplying operational amplifier 31. At the output of sampler 41, responsive to operational amplifier 31, there is developed the desired modulated, multiplexed, sampled signals $M_{1s}$, $M_{2s}$, etc. Sampler 41 may conveniently be incorporated in the operational amplifier circuit in a straightforward manner, if so desired. The circuit of FIG. 5 exhibits an amplification characteristic similar to the desired modulating signal shown in FIG. 4A. It should be understood that if the applied signal $f(t)$ is amplified in accordance with such a characteristic, the resulting output signal is identical to the signal formed by multiplying the input signal and the depicted modulating signal. Transistor switches $Q_1$, $Q_2$, $Q_3$ and $Q_4$ are used as saturating switches, as indicated by the legend below the waveforms of FIGS. 4A and 4B. The gain of the depicted apparatus may be expressed as:

G —gain with $Q_1$ on, $Q_2$ off, $Q_3$, $Q_4$ off
−G—gain with $Q_2$ on, $Q_1$ off, $Q_3$, $Q_4$ off
$\alpha$G—gain with $Q_1$ on, $Q_2$ off, $Q_3$, $Q_4$ on
−$\alpha$G—gain with $Q_2$ on, $Q_1$ off, $Q_3$, $Q_4$ on, where $\alpha$ in an illustrative case is equal to 0.414 and G is a preselected gain, e.g., $G=1.00$. Considering only one condition as an exemplary case, when $Q_1$ is on, $Q_2$, $Q_3$ and $Q_4$ off, resistor $R_3$ is grounded and signal $f(t)$ is applied to the positive terminal of amplifier 31 via the parallel combination of resistor $R_2'$, $R_{21}$ and $R_{22}$, in series with $R_4$. In such a case, it may be shown that the gain, G, of the modulator circuit is the product of $R_{f2}$ divided by the total resistance of the serial combination of resistor $R_4$ and the resistor complex $R_2'$, $R_{21}$, and $R_{22}$, multiplied by the quotient of $(R_{f1}+R_3)$ divided by $R_3$. A typical set of values for the resistors used in the circuit of FIG. 5 is shown in the following tabulation:

| | |
|---|---|
| $R_1'=10.000k$ | |
| $R_2'=9.015k$ | $R_{11}=6.307k$ |
| $R_3=12.222k$ | $R_{12}=3.693k$ |
| $R_4=1.759k$ | $R_{22}=5.68k$ |
| $R_{f1}=17.22k$ | $R_{21}=2.00k$ |
| $R_{f2}=4.194k$ | |

Figure 4A:
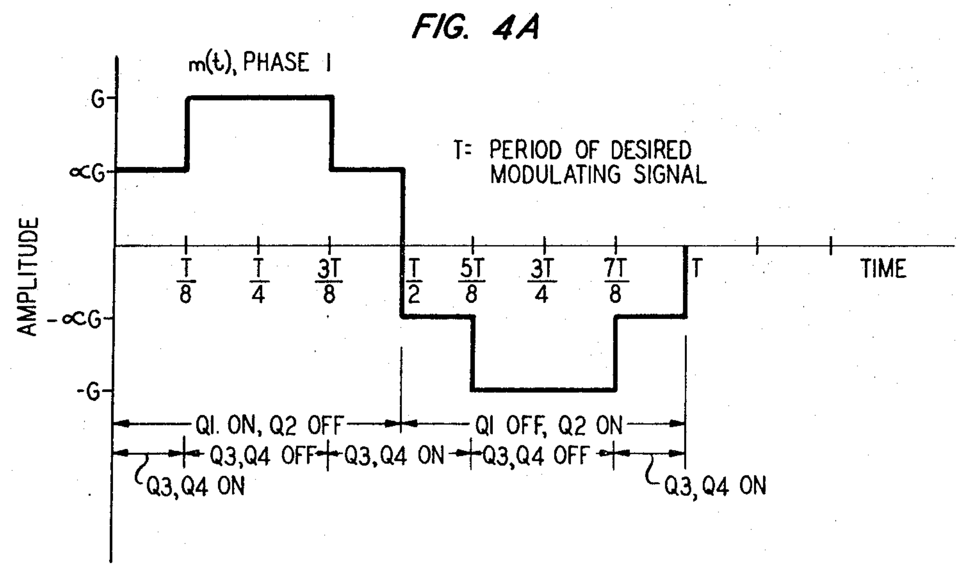
FIGS. 4A and 4B illustrate several modulating waveforms used in this invention.
Figure 4B:
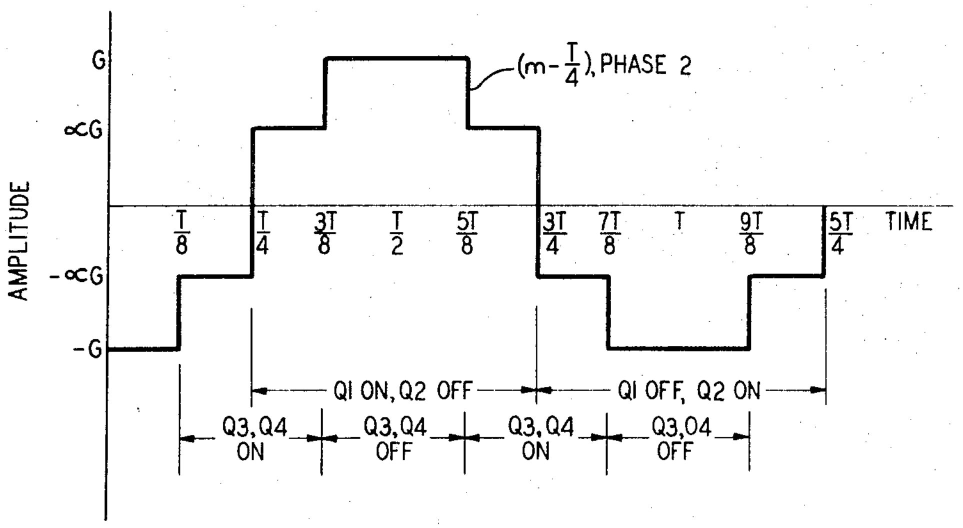
Figure 5:
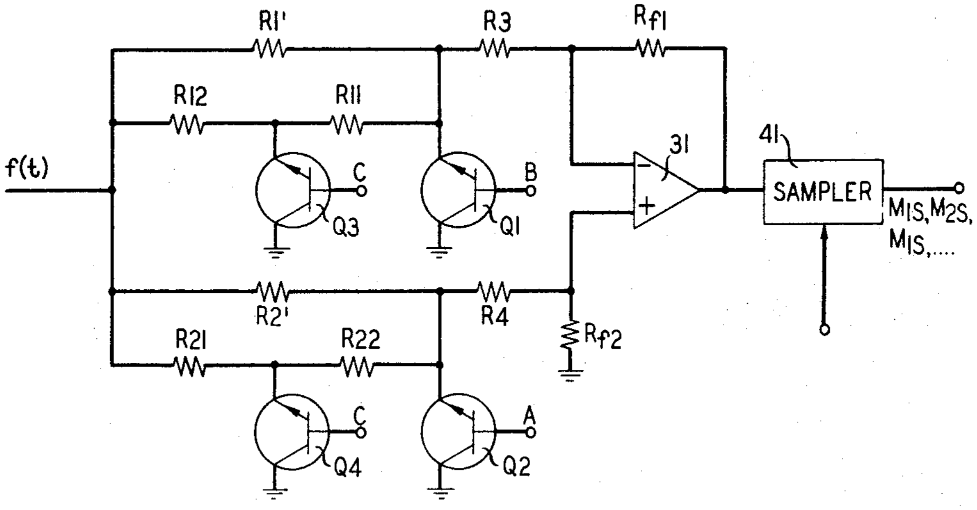
FIG. 5 shows a unified modulator-multiplexer circuit in accordance with this invention.
Figure 7:
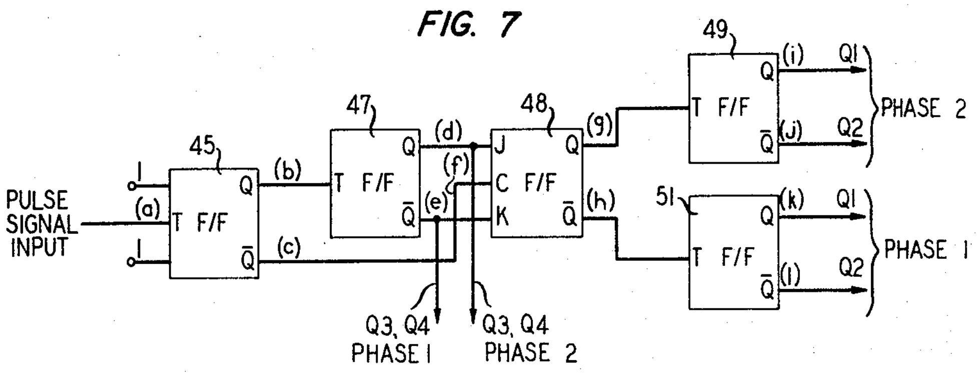
FIG. 7 illustrates waveform generating apparatus used in this invention.
Figure 6:
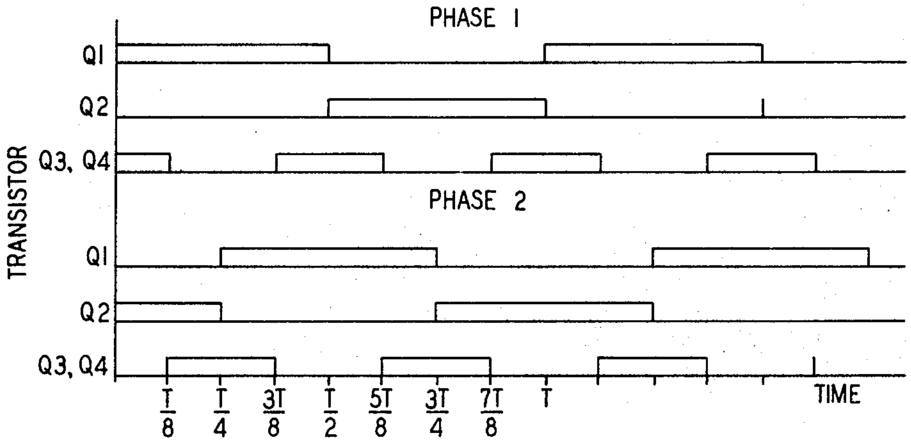
FIG. 6 depicts various switching waveforms applied to the circuit of FIG. 5.
Figure 8:
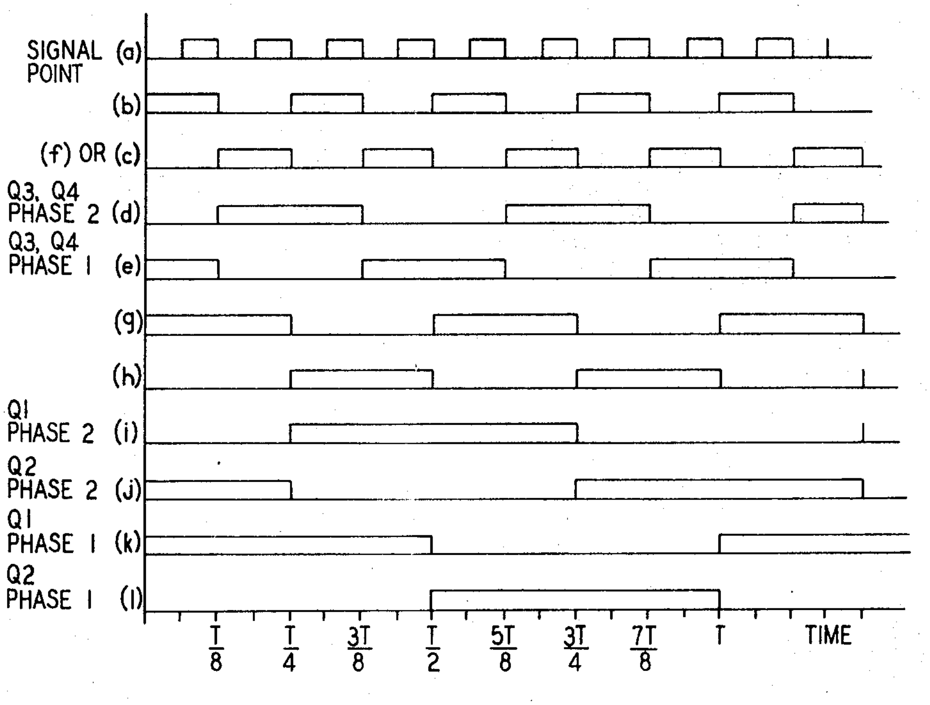

FIG. 6 depicts the switching waveforms, required by transistors $Q_1$, $Q_2$, etc., utilized in the circuitry of FIG. 5, for the two phases of the modulating signal shown in FIGS. 4A and 4B. A signal greater than "0" represents a condition where the indicated transistor is saturated; the absence of a signal signifies that the transistor is turned off. The circuitry of FIG. 7 generates the desired switching waveforms. The designated flip-flops, F/F, are conventional. The applied input signal need only be a train of pulses having the correct repetition rate, i.e., T/8. The various waveforms available at the designated signal points, (*a*), (*b*), (*c*)..., of the circuit of FIG. 7 are illustrated in FIG. 8. If it is assumed that output terminal Q of all the flip-flops is initially at logical "0" and that a flip-flop will change state when the applied signal at its "T" terminal becomes "0," it will be noted that all the desired waveforms are generated by the circuitry of FIG. 7.

A multiplexing network which will alternately apply to transistors $Q_1$, $Q_2$, etc., of FIG. 5, the switching waveforms for phases 1 and 2, shown in FIG. 6, is required. It is further required that a sample of each modulated waveform be developed and that the samples thereof alternate between the two modulating phases at the proper rate. If the sampling-clock signal developed by digital filter 19 of FIG. 2 is a square wave of the type shown in FIG. 9, having a fundamental frequency twice that of the sampling frequency, $f_s$, for one phase, we may impose the condition that on each falling edge of the waveform the switching signals applied to the transistor switches of FIG. 5 are changed from one phase to the other, and that on each rising edge of the depicted waveform a narrow sample of the modulator output is taken. In summary, the overall effect is that two phases of the modulated signal are sampled alternately.

Figure 9:
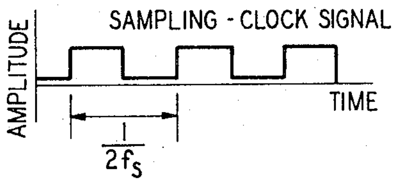
FIGS. 8 and 9 illustrate various waveforms used in this invention.
Figure 10:
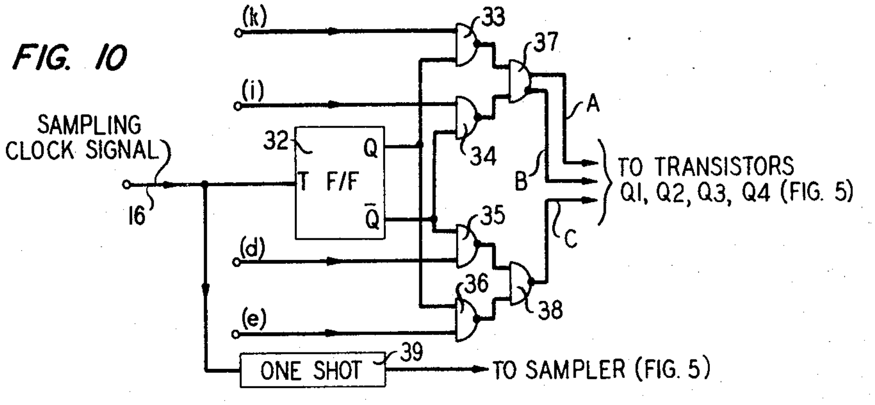
FIG. 10 depicts logic circuitry for controlling the multiplex operation of the circuit of FIG. 5.

Considering the circuit of FIG. 10, the sampling-clock signal of FIG. 9 is applied to terminal "T" of flip-flop 32. The output terminals of flip-flop 32 are connected to a plurality of logic, i.e., OR, circuits 33, 34, 35 and 36 which, in turn, supply signals to OR-circuits 37 and 38. The other signal inputs to the logic circuits are supplied by the apparatus of FIG. 7 and identified by the same letters used in FIGS. 7 and 8. Negation is indicated conventionally by a "dot" on a logic circuit terminal. Assuming that output terminal Q of F/F 32 is initially at state "0," every time the applied sampling-clock signals fall to "0" flip-flop 32 will change state. The output signals appearing on lines A, B and C for the two states of flip-flop 32 are as follows:

State 1 $Q=0$, $\bar{Q}=1$ $$A=\overline{(k+0)}+\overline{(i+1)}$$
$$=\bar{k}+0=\bar{k}$$
$$B=\bar{A}=k$$
$$C=\overline{(d+1)}+\overline{(e+0)}=e$$

Note that $k$, $\bar{k}$, i.e., $i$ and $e$ comprise the set of switching signals needed for phase 1; see FIGS. 6 and 8.

State 2 $Q=1$, $\bar{Q}=0$ $$A=\overline{(k+1)}+\overline{(i+0)}=0+\bar{i}=\bar{i}$$
$$B=\bar{A}=i$$
$$C=\overline{(d+0)}+\overline{(e+1)}=d$$

Note further that $i$, $\bar{i}$, i.e., $j$ and $d$ form the set of switching signals needed for phase 2. If output B is applied to transistor $Q_1$, output A applied to transistor $Q_2$, and output C applied to transistors $Q_3$ and $Q_4$, of FIG. 5, the desired multiplexing of the two modulator phases is achieved.

On each rising edge of the sampling-clock signal, shown in FIG. 9, one-shot multivibrator 39 activates sampler 41, FIG. 5, which develops a sampled version, $M_{1s}$, $M_{2s}$, $M_{1s}$...of the multiplexed signal appearing at the output of the modulator.

It is to be understood that the embodiments shown and described herein are illustrative of the principles of this invention only and that modifications of this invention may be implemented by those skilled in the art without departing from the scope and spirit of this invention; for example, numerous and diverse modulation, multiplex and sampling schemes may be utilized in the practice of this invention.

What is claimed is:

1. A time-varying network comprising:

means for selectively modulating an applied input signal with a plurality of predetermined modulating signals, means for developing multiplexed sample pulses of said modulated signals, digital filter means for processing said multiplexed sample pulses, means for demultiplexing pulses processed by said digital filter, and means for selectively demodulating said demultiplexed pulses.

2. An N-path filter comprising:

means for simultaneously modulating an applied input signal with a plurality of predetermined modulating signals and time multiplexing said plurality of modulated signals, means for developing sample pulses of said modulated multiplexed signals, digital filter means for processing said sample pulses, means for demultiplexing pulses processed by said digital filter, and means for demodulating said demultiplexed pulses.

3. The N-path filter defined in claim 2 wherein said means for simultaneously modulating and time multiplexing comprises:

operational amplifier means shunted by resistor means, a first circuit path responsive to said input signal comprising a first plurality of resistor means connected to one terminal of said operational amplifier means, a second circuit path responsive to said input signal comprising a second plurality of resistor means connected to another terminal of said operational amplifier means, and means for selectively altering the transmission characteristics of said first and second circuit paths.

4. An N-path filter comprising:

means for simultaneously modulating an applied input signal with a plurality of predetermined modulating waves, means for developing sample pulses of said modulated signals, means for time multiplexing said sample pulses, means for encoding said multiplexed sample pulses, 5. An N-path filter comprising:

means for simultaneously selectively modulating an applied input signal with plurality of predetermined modulating signals, multiplexing said plurality of modulated signals, and sampling said plurality of multiplexed signals, means for encoding said modulated multiplexed sample signal, digital filter means for processing said encoded signal, means for demultiplexing signals processed by said digital filter, means for decoding said demultiplexed signals, and means for demodulating said decoded signals.

6. The N-path filter defined in claim 5 wherein said means for simultaneously selectively modulating, multiplexing and sampling comprises:

operation amplifier means shunted by resistor means, a first circuit path responsive to said input signal comprising a first plurality of resistor means connected to one terminal of said operational amplifier means, a second circuit path responsive to said input signal comprising a second plurality of resistor means connected to another terminal of said operational amplifier means, means for selectively altering the gain of said amplifier in a stepwise manner, and means for sampling signals appearing at the output of said operational amplifier means.

7. An N-path filter comprising:

means for simultaneously selectively modulating an applied input signal with a plurality of predetermined modulating signals, multiplexing said plurality of modulated signals, and sampling said plurality of multiplexed signals, digital filter means for processing said modulated, multiplexed, and sampled signal, means for demultiplexing signals processed by said digital filter, and means for demodulating said demultiplexed signals.

8. The N-path filter defined in claim 7 wherein said means for simultaneously selectively modulating, multiplexing and sampling comprises:

operational amplifier means shunted by resistor means, a first circuit path responsive to said input signal comprising a first plurality of resistor means connected to one terminal of said operational amplifier means, a second circuit path responsive to said input signal comprising a second plurality of resistor means connected to another terminal of said operational amplifier means, means for selectively altering the gain of said amplifier in a stepwise manner, and means for sampling signals appearing at the output of said operational amplifier means.

* * * * *